Figure 1:
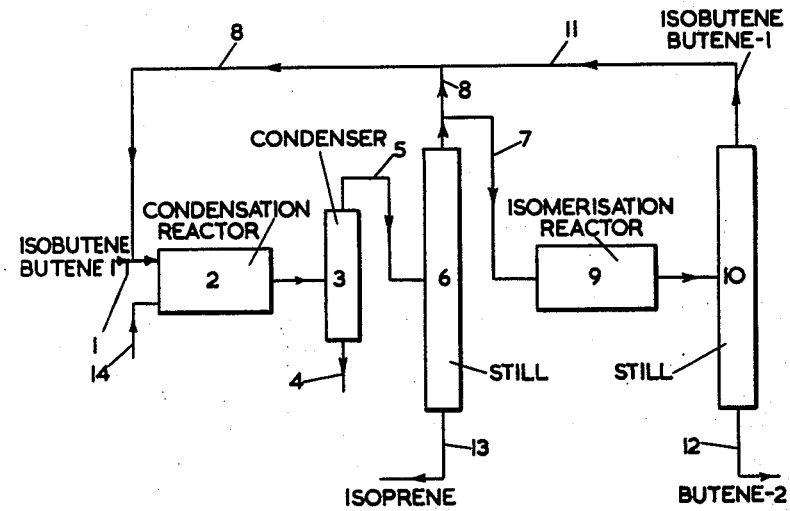

Aug. 25, 1964  J. HABESHAW ETAL  3,146,278
PRODUCTION OF CONJUGATED DIOLEFINS
Filed April 24, 1959

United States Patent Office 3,146,278
Patented Aug. 25, 1964

3,146,278
PRODUCTION OF CONJUGATED DIOLEFINS
John Habeshaw, Dollar, and Wilfred John Oldham, Grangemouth, Scotland, assignors to British Hydrocarbon Chemicals Limited, a British company
Filed Apr. 24, 1959, Ser. No. 808,808
Claims priority, application Great Britain Apr. 29, 1958
3 Claims. (Cl. 260—681)

The present invention relates to the production of conjugated diolefines by the reaction of aldehydes with monoolefines.

The condensation of isobutene with formaldehyde to form isoprene has already been described. In one process isobutene is reacted at an elevated temperautre in the vapour phase in the presence of a catalyst, the reaction products are condensed to form an aqueous phase and a hydrocarbon phase, and the hydrocarbon phase is fractionally distilled to recover unreacted isobutene as an overhead fraction, which is recycled to the reactor, and isoprene can be recovered from the residue.

The cheapest and most readily available source of isobutene is a $C_4$ fraction containing isobutene and butene-1, with or without butene-2, and derived from the products of petroleum cracking. Such mixtures of isobutene with the n-butenes are, however, considerably less useful than the isolated olefines, for most purposes. Thus, in the production of sec-butanol or butadiene from the n-butenes the presence of even small amounts of isobutene cannot be tolerated. Also isobutene containing appreciable amounts of n-butenes cannot be used to make high polymers of isobutene. Although butene-2 can be separated from such mixture by efficient fractional distillation, isobutene and butene-1 cannot be separated in practice either by fractional distillation or extractive distillation owing to the proximity of their boiling points.

According to the present invention the process for the production of isoprene comprises contacting a mixture in the vapour phase containing isobutene and butene-1 in a condensation reaction with formaldehyde in the presence of a catalyst at an elevated temperature to convert the isobutene to isoprene, while substantially all of the butene-1 remains unreacted, separating by fractional distillation of the condensation reaction product an overhead $C_4$ fraction containing unreacted isobutene and butene-1, and a bottom isoprene-containing fraction, and recovering isoprene from the bottom fraction.

It has been found that in the condensation reaction, the butene-1 reacts with formaldehyde to form piperylene, but that this reaction takes place so slowly in comparison with the very fast reaction of isobutene to isoprene, that substantially all of the butene-1 remains unreacted; only insignificant amounts of piperylene are formed, and these are easily separated from the isoprene product. The present invention thus provides a method of utilising the cheap mixtures of isobutene with butene-1 with or without butene-2 for the production of isoprene in which the difficult separation of isobutene from butene-1 is avoided.

In general, the process can be applied to any isobutene-containing $C_4$ feedstock substantially free from butadiene. The proportions of isobutene and butene-1 in the starting material are not critical, but it is preferred to use mixtures contatining at least 20% of isobutene. Suitable materials include $C_4$ fractions containing butene-2 in addition to butene-1, not more than about 10 to 15% of butanes and less than 5%, and preferably less than 2%, of butadiene. $C_4$ fractions of this type may be obtained from cracked petroleum hydrocarbons by fractional distillation and extraction methods.

The condensation reaction may be carried out in any suitable manner, for instance as described in our copending U.S. applications. Nos. 742,711, filed June 18, 1958, now U.S. Patent No. 2,993,940; 742,710; 760,530; and British applications Nos. 11,293/58; 11,294/58; 11,295/58; and 14,583/58.

U. S. appln. No. 742,711 relates to a process for the production of conjugated diolefines, such as isoprene, by reacting a lower mono-olefine such as isobutene with fomaldehyde or acetaldehyde at an elevated temperature in the vapour phase in the presence of an acidic surface-active clay catalyst. Suitable catalysts include acid-activated montmorillonites, bentonites, fullers' earths, vermiculites, attapulgites, kaolinites and illites. The aldehyde starting material is preferably a solution of formaldehyde in water, and may also be derived from a compound which gives rise to formaldehyde under the reaction conditions, such as trioxane or paraformaldehyde. The proportion of aldehyde in the total feed is suitably between 2 and 10 mole percent. The process is suitably carried out at temperatures between 150 and 400° C., and preferably between 250 and 350° C. The reaction may be carried out in the presence of an inert diluent such as steam. The space velocity of the reactants over the catalyst is preferably between 0.5 and 50 moles of aldehyde per litre of catalyst per hour.

U.S. application No. 742,710 filed June 18, 1958, now U.S. Patent No. 3,004,084 relates to a process similar to that disclosed in U.S. application No. 742,711 also filed June 18, 1958, in which the catalyst is a synthetic petroleum cracking catalyst containing from 0 to 10% of an oxide of a metal from Group II A of the Periodic Table. Suitable catalysts include silica/alumina, silica/magnesia, silica/zirconia and silica/titania. A preferred catalyst is silica/alumina containing about 85% by weight of silica, the average pore diameter of the silica exceeding 30A.

U.S. appln. No. 802,307 filed March 27, 1959, now U.S. Patent No. 2,997,509 corres. to B. A. 11,293/58, relates to a process similar to that disclosed in said U.S. application No. 742,711 in which the catalyst is a phosphate of an element from Group III B of the Periodic Table, such as boron phosphate or aluminium phosphate, preferably deposited on a support such as silica.

U.S. appln. No. 802,308 filed March 27, 1959, now U.S. Patent No. 2,977,396 corres to B. A. 11,294/58 relates to a process similar to that disclosed in said U.S. application No. 742,711 in which the catalyst is a phosphate of an element from Group II of the Periodic Table, such as cadmium phosphate.

U.S. appln. No. 802,286 filed March 27, 1959, now abandoned corres. to B. A. 11,295/58, relates to a process similar to that disclosed in said U.S. application No. 742,711 in which the catalyst is an iso-or heteropoly acid of molybdenum, tungsten or vanadium, or salts thereof. Suitable catalysts include silicotungstic acid, phosphotungstic acid, borotungstic acid, phosphomolybdic acid, or salts of these acids; the catalysts may be deposited on a support if desired.

U.S. application No. 760,530 filed September 12, 1958 now abandoned relates to a process for the production of conjugated diolefines such as isoprene by catalytically reacting a lower mono-olefine such as isobutene with formaldehyde or acetaldehyde at an elevated temperature in the vapour phase at a molar ratio of olefine to aldehyde of at least 6:1, preferably at least 8:1.

British application 14,583/58 relates to a process similar to that disclosed in said U.S. application No. 742,711 in which the catalyst is an appreciably volatile acid such as hydrogen chloride, and a solid contact material, such as silica gel.

The gaseous product from the condensation reaction is suitably condensed and allowed to separate into two phases; the aqueous phase contains unreacted formaldehyde which can be recycled to the condensation reaction after concentration to the required formaldehyde content.

The hydrocarbon phase is separated by distillation into an overhead $C_4$ fraction, containing unreacted isobutene and butene-1 and a bottom isoprene-containing fraction, which can be further treated to obtain the isoprene, in a pure form. The overhead $C_4$ fraction may be partly recycled to the condensation reaction, but it is necessary to remove part of this fraction from the system to prevent build-up of butene-1.

In a preferred embodiment the condensation reaction forms one stage of a two-stage process, the other stage being an isomerisation reaction in which butene-1 is converted to butene-2. In this two-stage process part or all of the overhead $C_4$ fraction of the condensation reaction product containing unreacted isobutene and butene-1 is introduced into the isomerisation reaction to convert the butene-1 to butene-2. The isomerisation reaction product is fractionally distilled to separate an overhead fraction containing isobutene and butene-1 substantially free from butene-2, which can be recycled to the condensation stage and/or to the isomerisation stage, and a higher boiling fraction containing butene-2 substantially free from isobutene and butene-1. The initial starting material, comprising a mixture containing isobutene and butene-1, with or without butene-2, may be introduced into the two-stage process as the feed to the condensation reaction and/or as the feed to the isomerisation reaction. Where the initial starting material comprises a mixture of isobutene, butene-1 and butene-2, it is preferred to introduce this as a feed to the isomerisation stage.

The two-stage process has the further advantage of utilising completely as feedstock the cheap inseparable mixtures of isobutene and butene-1, the butene-1 being converted into butene-2 which is obtained uncontaminated with butene-1, and all of the isobutene being converted into isoprene.

The isomerisation of the overhead $C_4$ fraction containing unreacted isobutene and butene-1 to convert the butene-1 to butene-2 can be carried out in any suitable manner, for instance by passing the mixture at an elevated temperature in the liquid or vapour phase over a suitable catalyst. Processes of this type are disclosed in U.S. Patents 2,403,672 and 2,428,516. It is preferred to carry out the isomerisation at temperatures below 200° C. Catalysts which may be used in the reaction include mineral acids, either as such or supported on alumina, kieselguhr, bauxite or porcelain chips, silica/alumina, surface-active earths, magnesium oxide, activated brucite, activated magnesite, reduced nickel or cobalt catalysts, black chromium oxide, and tungsten/nickel sulphide. The conversion of butene-1 to butene-2 in the isomerisation step is limited by the thermodynamic equilibrium proportions at a given temperature of isomerisation. The product of the isomerisation reaction therefore consists of a mixture of isobutene, butene-1 and butene-2.

It has further been found that in the condensation reaction part of the butene-1 in the feed is isomerised to butene-2, so that the overhead $C_4$ fraction obtained by distillation of the condensation reaction product contains butene-2 in additional to unreacted isobutene and butene-1. In a particularly preferred embodiment part of this overhead $C_4$ fraction is introduced directly to the fractional distillation step after the isomerisation reaction, thus by-passing the isomerisation stage. The proportion of this recycle stream to the feed to the isomerisation reaction is adjusted to conform with the degree of isomerisation of butene-1 to butene-2 in the condensation reaction.

The process of the present invention is further illustrated with reference to the accompanying drawings.

FIGURE 1 is a simplified flow diagram of a two-stage process according to the present invention in which the initial starting material is introduced to the condensation stage. A vapour phase mixture of isobutene and butene-1 is fed by line 1 to the condensation reactor 2. Formaldehyde is also fed into the condensation reactor by line 14. In the condensation reactor the isobutene is converted to isoprene. The gaseous product from the condensation reactor is condensed in the condenser 3, where it separates into two phases, the aqueous phase being taken off by line 4 and treated for the recovery and recycle of formaldehyde (not shown). The hydrocarbon phase is passed by line 5 into the still 6, where it is separated into a bottom isoprene fraction, which is withdrawn by line 13 and an overhead $C_4$ fraction containing unreacted isobutene and butene-1. Part of the overhead $C_4$ fraction is recycled to the condensation reactor 2 by line 8, while a second part is introduced to the isomerisation reactor 9 by line 7, the relative proportions of the two recycle streams being adjusted to prevent build-up of butene-1 in the feed to the condensation reactor 2. In the isomerisation reactor 9 part of the butene-1 is converted to butene-2. The product of the isomerisation reaction is passed into still 10, from which a bottom fraction containing butene-2 substantially free from isobutene and butene-1 is withdrawn by line 12. An overhead fraction containing isobutene and butene-1, but substantially no butene-2, is recycled by line 11 to the condensation reactor 2.

Figure 2:
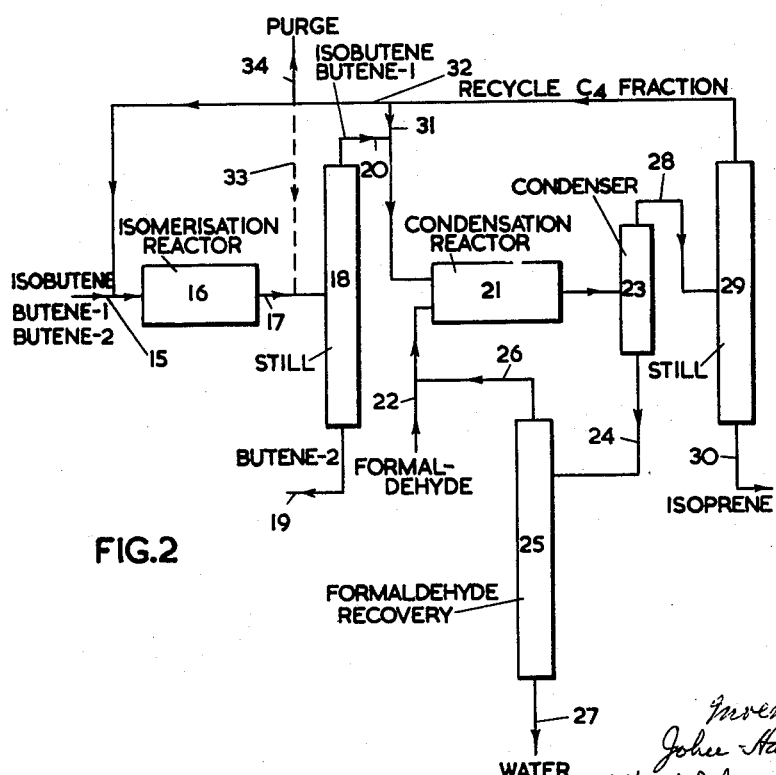

FIGURE 2 is a simplified flow diagram of a two-stage process according to the present invention in which the initial starting material is introduced into the isomerisation reaction. A mixture of isobutene, butene-1 and butene-2 is fed by line 15 to the isomerisation reactor 16, where at least part of the butene-1 is converted to butene-2. The product of the isomerisation reaction is passed by line 17 to the distillation column 18 from which a bottom fraction containing butene-2 substantially free from isobutene and butene-1 is withdrawn by line 19. An overhead fraction containing isobutene and butene-1, but substantially no butene-2, is passed by line 20 to the condensation reactor 21. Formaldehyde is also fed into the condensation reactor by line 22. The gaseous product from the condensation reactor is condensed in the condenser 23 where it separates into two phases, the aqueous phase being taken off by line 24 into the recovery stage 25, where an aqueous formaldehyde concentrate is recovered and recycled by line 26 to the condensation reactor 21. Water is discarded by line 27. The hydrocarbon phase is passed by line 28 into the still 29 where it is separated into a bottom isoprene fraction, which is withdrawn by line 30, and an overhead $C_4$ fraction containing unreacted isobutene, butene-1 and butene-2. Part of the overhead $C_4$ fraction is recycled to the condensation reactor by line 31, while a second part is recycled to the isomerisation reactor by line 32, the relative proportions of the two recycle streams being adjusted to prevent build-up of butene-1 in the feed to the condensation reactor. If desired a part of the recycle to the isomerisation reactor 16 can be diverted along dotted line 33 to bypass the isomerisation reactor, the proportion of this recycle stream depending on the degree of isomerisation of butene-1 and butene-2 in the condensation reactor. If the starting material for the process contains appreciable proportions of butanes and/or butadiene, these may tend to build up in the system, and can be removed by taking a purge stream by line 34 from the overhead $C_4$ fraction.

The isoprene product removed through line 30 may be further purified to the required extent by redistillation or other means.

The process of the invention is further illustrated with reference to the following Examples.

*Example 1*

A mixture of formaldehyde, steam and hydrogen chloride, derived from aqueous 18% formalin containing hydrogen chloride in solution, with a $C_4$ hydrocarbon feed containing isobutene and butene-1 was passed in the vapour phase over granular silica gel of 120 A. average pore diameter at atmospheric pressure and at a temperature of 300° C. The $C_4$ hydrocarbon feed had the following composition (moles percent):

| | |
|---|---|
| Isobutene | 51.2 |
| Butene-1 | 38.3 |
| Butene-2 | 1.5 |
| Isobutane | 2.0 |
| n-Butane | 4.4 |
| Butadiene | 2.6 | and the total feed was of the following composition (moles percent):

| | |
|---|---|
| Formaldehyde | 8.1 |
| Isobutene | 34.5 |
| Other $C_4$ hydrocarbons | 32.9 |
| Hydrogen chloride | 0.4 |
| Methanol+water | 24.2 |

The total feed rate was 76 moles/litre catalyst/hour.

The gaseous product was condensed and the hydrocarbon phase separated from the aqueous formaldehyde phase. The hydrocarbon phase was fractionally distilled to recover an overhead $C_4$ fraction and a bottom isoprene-containing fraction.

The efficiency of formation of isoprene was 65 mole percent based on the formaldehyde consumed. The conversion of formaldehyde was 38%. From the analysis of the overhead $C_4$ fraction, only 2.5% of the butene-1 fed underwent reaction, being mainly converted to butene-2. No piperylene was found in the reaction products; thus virtually no condensation of butene-1 with formaldehyde could be detected.

*Example 2*

The process is carried out as illustrated in FIGURE 2. The starting material consists of the $C_4$ fraction of a steam cracked petroleum from which the butadiene has been removed by selective extraction, and which is dried prior to the isomerisation step. The dried fraction contains about 42% by weight of isobutene, 25% of butene-1, 19% of butene-2, 10% of isobutane, 2.5% of n-butane and 1.5% of butadiene. The starting material is contacted at a temperature of about 100° C. and at a pressure sufficient to maintain the mixture in the liquid phase with activated granular brucite (hydrated magnesium oxide) contained in the isomerisation reactor 16. The residence time in the reactor is approximately one hour, the exact time being dependent on the activity of the catalyst. The isomerisation reaction product, which contains about 42% of isobutene, 10% of butene-1, 33% of butene-2, 10% of isobutane, 2.5% of n-butane and 1.5% of butadiene, is fed at an intermediate point into the distillation column 18, which is operated to take off a bottom fraction containing about 87% of butene-2, 3% of isobutene, 1% of butene-1, 7% of n-butane and 2% of butadiene. From the top of the distillation column 18, an overhead fraction is withdrawn containing about 65% isobutene, 16% of butene-1, 2% of butene-2, 16% of isobutane, 0.1% of n-butane and 1% of butadiene.

The overhead isobutene-containing fraction is fed in the vapour phase into the condensation reactor 21, which contains a boron phosphate/silica gel catalyst. Formaldehyde is also fed into the condensation reactor, the mole ratio of isobutene to formaldehyde in the feed (including recycle) being 4:1. The condensation reaction is carried out at a temperature of about 300° C. The space velocities of the reactants over the catalyst are approximately 35 moles of total feed per litre of catalyst per hour. The gaseous product from the condensation reactor is condensed in the condenser 23, where it separates into two phases, the lower aqueous phase being removed by line 24 for the recovery and recycle of formaldehyde. The hydrocarbon phase obtained from the condenser 23, which contains about 55% of isobutene, 14% of butene-1, 4% of butene-2, 15.4% of isobutane, 0.1% of n-butane, 0.3% of butadiene, 8% of isoprene and 3% of higher boiling by-products, is introduced at an intermediate point into the fractionating column 29 from which the isoprene is recovered as a bottom fraction. From the top of column 29 an overhead $C_4$ fraction is obtained, containing 62% of isobutene, 16% of butene-1 4% of butene-2, 17% of isobutane, 0.2% of n-butane and 0.4% of butadiene.

The overhead $C_4$ fraction may be recycled partly or wholly to the isomerisation reactor 16, if desired part being directly recycled to the condensation reactor 21. A third part of the overhead $C_4$ fraction may be recycled by line 33 to the feed to the distillation column 18, thus by-passing the isomerisation stage, the amount of this recycle being proportional to the amount of isomerisation of butene-1 to butene-2 in condensation reactor 21.

We claim:

1. A two-stage process for the production of isoprene and butene-2 from mixtures of isobutene and butene-1 while avoiding the separation of isobutene and butene-1 which comprises, in combination, contacting isobutene and butene-1 with formaldehyde in the vapor phase in the presence of a catalyst at a temperature between 150° and 400° C. in a condensation stage to convert isobutene to isoprene, while substantially all of the butene-1 remains unreacted, separating by fractional distillation of the condensation reaction product an overhead $C_4$ fraction containing unreacted isobutene and butene-1, and a bottom isoprene-containing fraction, isomerizing the isobutene and butene-1 to convert at least part of the butene-1 to butene-2, fractionally distilling the isomerisation reaction product to separate an overhead fraction containing isobutene and butene-1 substantially free from butene-2, and a higher boiling fraction containing butene-2 and introducing the isobutene and butene-1 to the condensation stage.

2. The process as claimed in claim 1 wherein the initial starting mixture containing isobutene and butene-1 is introduced into the two-stage process as the feed to the isomerisation reaction.

3. The process as claimed in claim 2 wherein part of the overhead $C_4$ fraction of the condensation reaction product is introduced directly to the fractional distillation after the isomerisation reaction.

References Cited in the file of this patent
UNITED STATES PATENTS

| | | |
|---|---|---|
| 2,335,691 | Mottern | Nov. 30, 1943 |
| 2,350,485 | Arundale et al. | June 6, 1944 |
| 2,386,055 | Mottern | Oct. 2, 1945 |
| 2,389,205 | Marsh | Nov. 20, 1945 |
| 2,428,516 | Drennan | Oct. 7, 1947 |